C. T. BOWEN.
FRUIT PICKER.
APPLICATION FILED APR. 18, 1911.
1,012,977.
Patented Dec. 26, 1911.
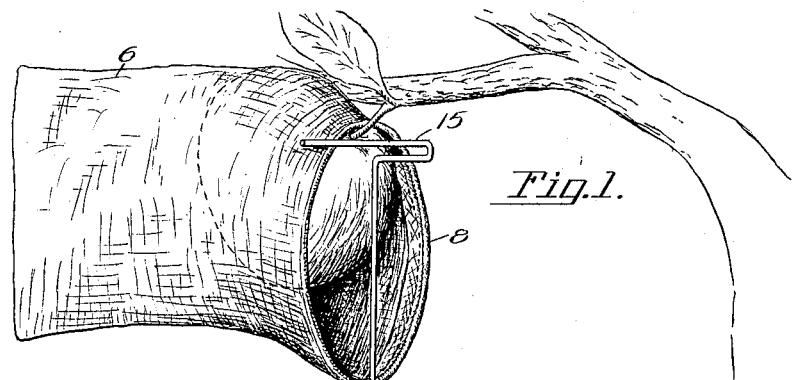
*Fig. 1.*
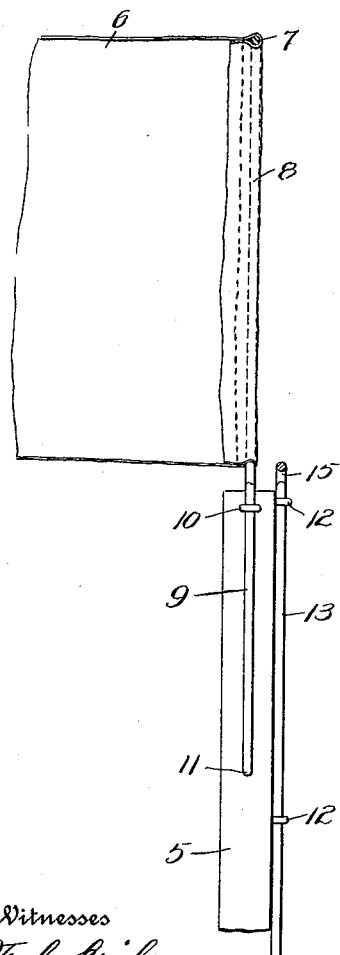
*Fig. 2.*
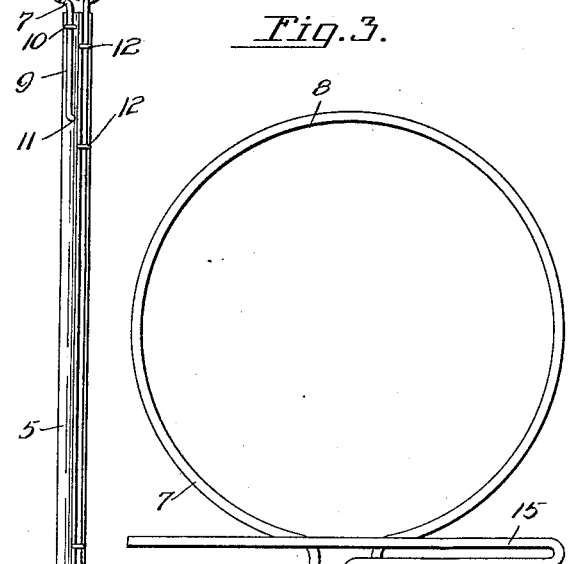
*Fig. 3.*
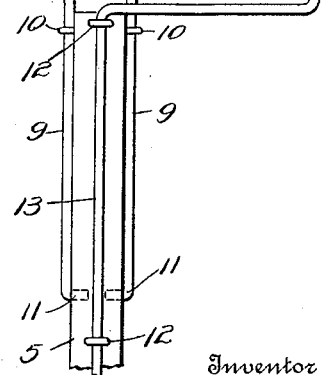
Witnesses
F. C. Gibson
L. O. Parker
Inventor
Charles T. Bowen.
By Victor J. Evans
Attorney
COLUMBIA PLANOGRAPH CO., WASHINGTON, D. C.

UNITED STATES PATENT OFFICE.

CHARLES T. BOWEN, OF COLUMBUS, OHIO.

FRUIT-PICKER.

1,012,977.  Specification of Letters Patent.  Patented Dec. 26, 1911.

Application filed April 18, 1911. Serial No. 621,774.

*To all whom it may concern:*

Be it known that I, CHARLES T. BOWEN, a citizen of the United States, residing at Columbus, in the county of Franklin and State of Ohio, have invented new and useful Improvements in Fruit-Pickers, of which the following is a specification.

The invention relates to fruit pickers, and has for its primary object an improved device of this character which is designed to effectually strip fruit from the branches of a tree, so as to obviate the necessity of a person climbing the tree or knocking the fruit from the latter for the gathering thereof.

Another object of the invention is the provision of a device of this character which is simple in construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a perspective view of a device constructed in accordance with the invention. Fig. 2 is a fragmentary vertical longitudinal sectional view thereof. Fig. 3 is a fragmentary enlarged elevation of the device.

Similar reference characters indicate corresponding parts throughout the several views of the drawings.

Referring to the drawings by numerals, the device comprises a pole or handle 5, preferably of tubiform and may be of any desirable length as required, and carries at one end a bag or receptacle 6, the same being hung upon a frame 7, formed from a single strand of rigid wire bent medially of its length to provide a circular shaped loop 8 and straight parallel ends 9, the same being disposed at diametrically opposite sides of the pole or handle 5, and are secured thereto by means of staples 10, the extremities of the ends being inturned to provide engaging lugs 11 which extend into suitable sockets formed in the pole or handle. The bag or receptacle 6 is fastened upon the frame in any suitable manner, so as to be open at its mouth portion.

Secured in the pole or handle, at intervals thereof, are alining guide eye members 12, in which is slidably mounted a rod 13, the inner end of which is bent to form a T cross head 15, the same being adapted to lie transversely of the frame and to move longitudinally of the same, so that on reciprocating the rod 13, the T cross head 15 will strike the stem of a fruit hanging upon a tree, so as to dismember or remove it therefrom, whereby the latter when falling off the tree will drop into and be caught by the receptacle 6, the rod 13 being formed at an intermediate point with an outturned finger projection 16 to be engaged by the hand of an operator for reciprocatingly moving the said rod for the purpose above stated.

From the foregoing, taken in connection with the accompanying drawings, it is thought that the construction and operation of the invention will be readily understood, without requiring a more extended explanation, and therefore the same has been omitted.

What is claimed is:

1. The combination with a pole, of a wire frame bent to provide a circular loop and parallel ends disposed at opposite sides of one end of the pole, means fastening the ends of the frame to the pole, a bag secured at its mouth to the loop, and a rod slidably connected with the pole and having a U-shaped end disposed at right angles to the axis thereof and lying in a plane parallel to the plane of the loop, the free limb of the U-shaped end being of greater length than the other limb thereof connected with the rod, the free limb of the U-shaped end of the rod being disposed transversely across the mouth of the bag.

2. The combination with a pole, of a wire frame bent to provide a circular loop and parallel ends disposed at opposite sides of one end of the pole, means fastening the ends of the frame to the pole, a bag secured at its mouth to the loop, a rod slidably connected with the pole and having a U-shaped end disposed at right angles to the axis thereof and lying in a plane parallel to the plane of the loop, the free limb of the U-shaped end being of greater length than the other limb thereof connected with the rod, the free limb of the U-shaped end of the rod being disposed transversely across the mouth of the bag, and a plurality of outbent portions formed at intervals in the rod to provide finger engaging notches.

In testimony whereof I affix my signature in presence of two witnesses.

CHARLES T. BOWEN.

Witnesses:
A. R. WARDEN,
CHARLES GARRISON.

Copies of this patent may be obtained for five cents each, by addressing the "Commissioner of Patents, Washington, D. C."